United States Patent [19]
Cummings

[11] Patent Number: 5,908,009
[45] Date of Patent: Jun. 1, 1999

[54] CATTLE HEAD GATE

[76] Inventor: William D. Cummings, P.O. Box 1635, Garden City, Kans. 67846-1635

[21] Appl. No.: 08/792,280

[22] Filed: Jan. 31, 1997

[51] Int. Cl.$^6$ .................................................. A01K 1/062
[52] U.S. Cl. .......................................... 119/734; 119/731
[58] Field of Search ................................... 119/731, 734, 119/735, 737

[56]  References Cited

U.S. PATENT DOCUMENTS

| 2,833,248 | 5/1958 | Meyer et al. | 119/734 |
| 3,051,127 | 8/1962 | Norbury | 119/734 |
| 4,357,906 | 11/1982 | Kratky | 119/731 |
| 4,579,084 | 4/1986 | McCan et al. | 119/731 |

FOREIGN PATENT DOCUMENTS

| 2515479 | 5/1983 | France | 119/737 |
| 1555424 | 11/1979 | United Kingdom | 119/735 |

*Primary Examiner*—Michael J. Carone
*Assistant Examiner*—Elizabeth Shaw
*Attorney, Agent, or Firm*—Edward L. Brown, Jr.

[57] ABSTRACT

Cattle head gate on a squeeze chute which includes a pair of gates which open outwardly, with each gate pivotally attached to the chute about separate vertical axes, the vertical axis of each gate being positioned longitudinally outside of the squeeze chute. Actuating arms connected to the gates swing the gates into a closed position with a longitudinal component of the gates' movement in the same direction as that of the animal.

7 Claims, 4 Drawing Sheets

CATTLE HEAD GATE

FIELD OF THE INVENTION

This invention relates to livestock handling and more particularly to the head gate of a cattle squeeze chute wherein the closing gates are moving forward with the cattle when impacted by the animal so as to minimize the trauma or injury to the cattle.

BACKGROUND OF THE INVENTION

From time to time all types of cattle require immobilization for various types of treatment, including drugs, vitamins, branding, ear tagging, along with general examination. To accomplish this, the animals are herded into a narrow chute designed to confine the animal during the necessary treatments. Typically squeeze chutes of this nature involve a pair of doors or gates which form the head gate and swing inward to block the path of the animal in its shoulder area, allowing the head to pass therethrough. Typically the chutes include a pair movable sidewalls which prevent the animal from turning around once in the chute. Also included is an entrance gate at the rear of the squeeze chute which blocks the animal from backing out of the chute. Once the animal is stopped within the chute, the sidewalls are usually brought closer together to further prevent movement of the animal. The head gates, typically in the closed position, surround the neck of the animal and restrict vertical movement of the head as well as the side to side movement.

Most head gates on the market today rotate about a horizontal axis located at the ground level or below with lateral movement of the gates in unison to the closed position. Gates of this nature are typified in applicant's own U.S. Pat. No. 5,263,438 and the patent to Simington, U.S. Pat. No. 4,702,200. Typically head gates and squeeze chutes are constructed from heavy gauge steel tubing and are rigid. They provide no flexing when the animal slams into the closing gates. This abrupt deceleration of a heavy animal causes a degree of trauma to the animal and is the primary problem the present invention is attempting to avoid.

A partial solution to this problem is addressed in applicant's above-mentioned patent wherein the head gate itself is spring mounted to the squeeze chute frame so there is a degree of give as the animal impacts the head gate.

A second type of head gate wherein the pair of gates rotate about a vertical axis positioned along the sides of the chute are typified in the U.S. Pat. No. 4,201,157 to Lambert wherein a pair of gates swing like conventional doors and as the gates come in contact with the animal they are moving in the opposite direction of the animal towards there fully closed position. The closing impact velocity which the animal experiences along with the trauma is thereby increased due to the direction of movement of the closing gates.

A variation of the last mentioned patent is shown in the U.S. Pat. No. 5,331,923 to Mollhagen, wherein the vertical axis of the gates is offset and to the rear of the gates.

This same problem is addressed in the patent to Akins, U.S. Pat. No. 5,111,773. In this patent, the axis of movement of the door is conventionally located in the plane of the gate. However, in the opened position, the gates are folded inward in the squeeze chute and swing outward toward their closed position as they engage the animal which also provides a slower closing velocity. From a design standpoint, folding the gates inward creates limitations as to moving the sidewalls of the chute inward to restrict the animal.

SUMMARY OF THE PRESENT INVENTION

By positioning the rotational axis of applicant's pair of gates forwardly of both the chute and the head gate, it is possible to swing the gates from outside inward to the closed position while still retaining gate movement just prior to contact with the animal that is moving in the same direction as the animal so as to minimize impact trauma. The animal contacting surface on applicant's gates provides a wide arcuate contacting surface in the last of 30° of rotational movement of the gates so as to minimize trauma. The animal contacting surface is fabricated from lighter gauge sheet stock than the frame members of the gates and chute.

It is therefore the principal object of the present invention to provide a head gate design which minimizes the impact to the animal.

Another object of the present invention is to provide an improved cattle head gate structure with an animal contacting surface which minimizes trauma on impact with the animal.

These and other objects and advantages of the head gate design of the present invention will become more fully apparent as the description which follows is read in conjunction with the drawings.

DETAILED DESCRIPTION OF THE DRAWINGS

Figure 1:
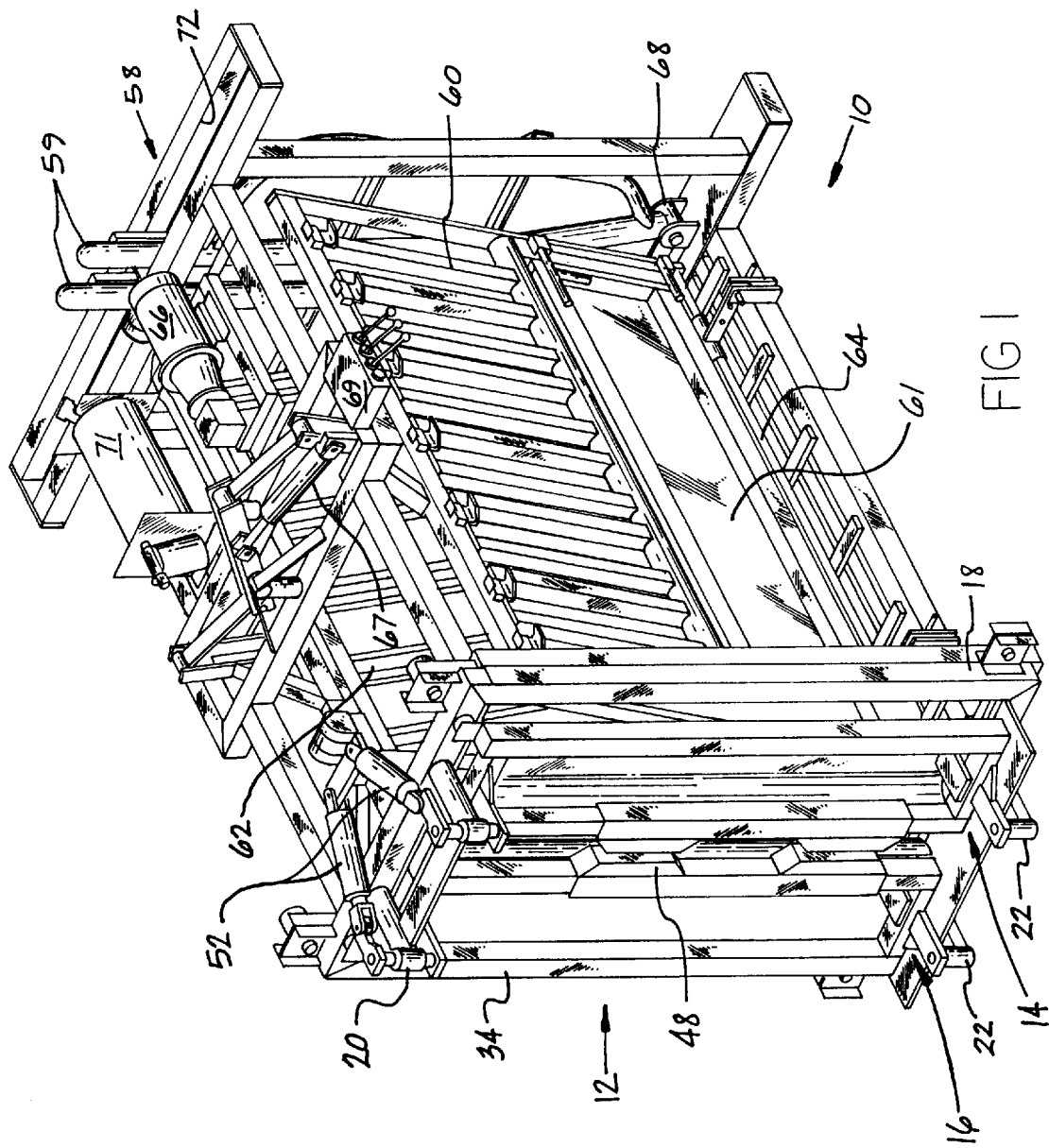
FIG. 1 is a left side upper perspective view of a squeeze chute incorporating the head gate of the present invention.
Figure 2:
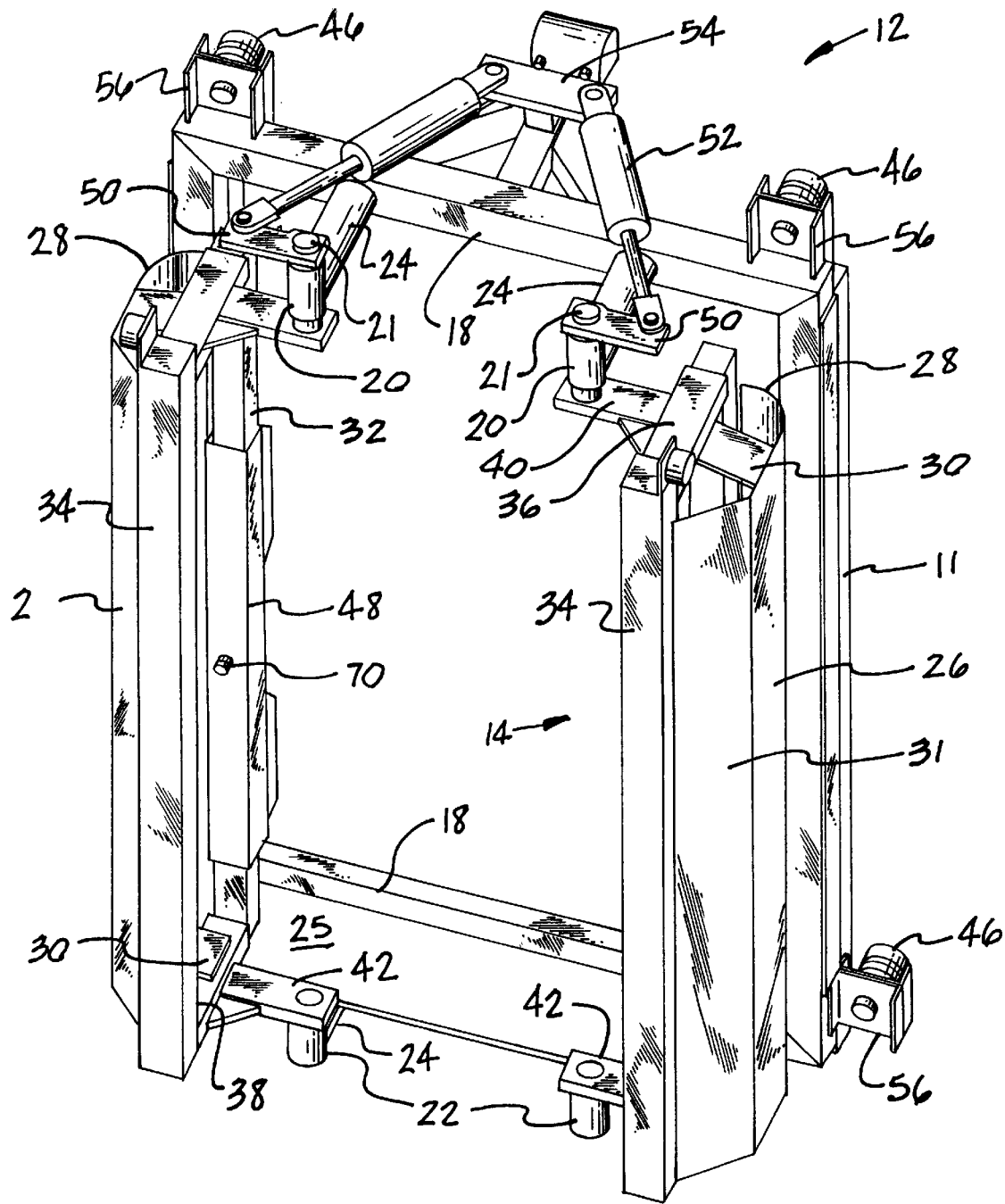
FIG. 2 is a perspective view of the head gate structure to an enlarged scale in the fully opened position.
Figure 3:
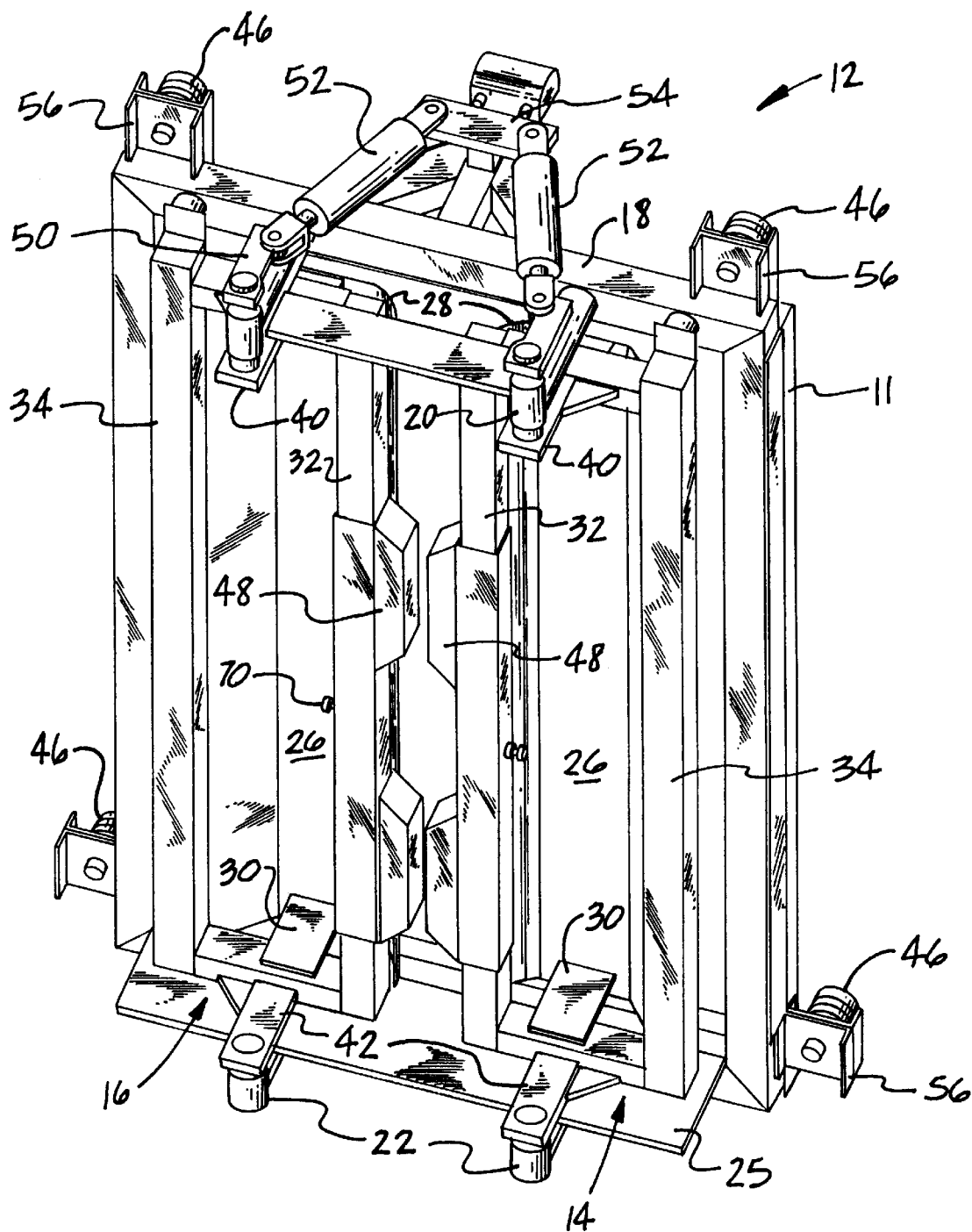
FIG. 3 is a perspective view similar to that of FIG. 2 with the head gate in the fully closed position.
Figure 4:
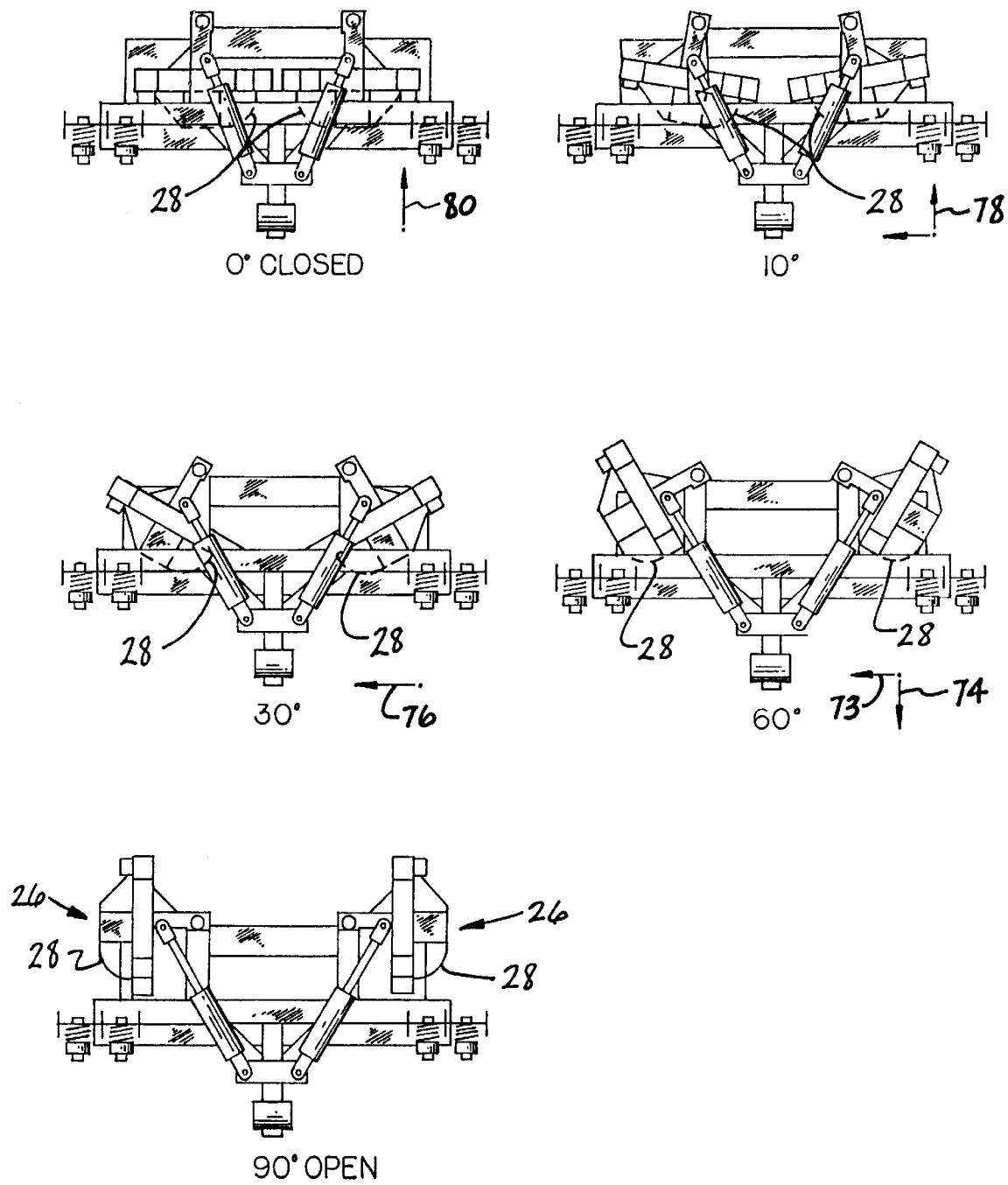
FIG. 4 is a series of top elevational views of the head gate in their various angular positions between fully opened to fully closed.

FIG. 1 illustrates a cattle squeeze chute generally identified as reference numeral 10. The head gate assembly 12 is the subject matter of the present invention and is shown in FIGS. 2 through 4. As shown in FIG. 1, the head gate assembly 12 is mounted on the left end of the squeeze chute 10, with the right and left gates 16 and 14 respectively shown in their closed position. The head gate assembly 12 is best shown in FIG. 2 with the gates 16 and 14 in their fully opened position. Head gate assembly 12 is mounted on a rectangle frame 18 fabricated from welded square tubing. The frame 18 connects to the squeeze chute frame structure 11 through compression springs 46 which are located at the four corners of the head gate assembly. This spring mounted head gate design is the subject of applicant's above-mentioned prior patent and will not be described in detail.

The gates 16 and 14 are mounted on upper hinge pivots 20 and lower hinge pivots 22 for pivotal movement about separate vertical axes. Hinge pivots 20 and 22 are forwardly and inwardly offset from the head gate 18 and are carried on extension bars 24.

Right gate 16 is a mirror image of left gate 14 and comprises a rectangular frame constructed of a pair of vertical tubes 32 and 34 which are joined by a pair of horizontal tubes 36 and 38 in a welded construction. Connected to upper horizontal tube 36 is an offset leg 40 which supports the gate hinge pivot 20 in an offset nature. Lower offset leg 42 connects with lower hinge pivots 22 along a concentric axis of rotation with upper hinge pivots 20. Both gates 14 and 16 include an animal contacting plate 26 which includes a curved arcuate portion 28 which curves the contacting plate 26 through 90°. The contacting plate 26 is attached to the frame of each gate by a pair of tabs 30 which attach the ends of the contacting plate 26 to the frame of the gate at the upper and lower ends thereof. Contacting plate 26 also includes two planar portions 29 and 31 which extend longitudinally and are bent relative to each other so as to provide a general channel shape with the arcuate surface 28.

Located at the upper ends of the frame members 34 of each gate is a resilient stop member 44 which limits the rotational position of the gates in their closed positions. Located at each hinge pivot 20 is an axle 21 having an offset pivot arm 50 anchored thereto which axle 21 is in turn anchored to upper offset leg 40. Pivotally connected to arm 50 on each gate is the clevis end of a pair of double acting hydraulic cylinders 52. The cylinders 52 are anchored to the head gate frame 18 through support structure 54. Hydraulic cylinders 52 are actuated by a hydraulic power source 66, as shown in FIG. 1, which actuates both cylinders in phase by any one of many hydraulic or mechanical well-known means to maintain in phase actuation of a pair of cylinders which are not disclosed in this application.

In FIG. 3, the right and left head gates 16 and 14 are shown in their fully closed position. Vertical tube 32 on each gate includes a head gate clamping bar 48 which can be adjustably slid upwards or downwards to accommodate the neck height of the animal in the squeeze chute 10. Set screws 70 fix the vertical position of bars 48.

FIG. 1 illustrates a somewhat conventional squeeze chute 10 which includes an entrance gate 58 at the rear of the squeeze chute having a pair of gate panels 59 which rotate about a horizontal pivot axis 68 with the upper ends of the gate panels 59 restrained in a lateral frame slot 72. Hydraulic cylinders, not shown, actuate gate panels 59. The sidewalls 60 of the squeeze chute are conventional and pivot about shaft 64. The pivot axis can be moved inwardly or outwardly depending upon the particular usage which is also conventional. The tilting of the sidewalls 60 and 62 is accomplished by a hydraulic cylinder 67 which is in turn mechanically connected to both side walls, all of which is well known in the prior art and is not described in detail. Hydraulic power source 66 is also conventional including an electric motor, driving a hydraulic pump which supplies conventional spool valves 69 and a hydraulic reservoir 71 for returning fluid. The means to maintain cylinders 52 in phase with each other during an actuation is not shown but is also well known in the art.

OPERATION

Directing attention to FIG. 4, the head gates 14 and 16 are shown in a variety of positions from fully opened at a 90° position, fully closed at 0° and in between positions at 10°, 30° and 60°. From the fully opened position, the right gate 16 begins to rotate about hinge pivot 20 as it moves toward its closed position. At the 60° position, the arcuate surface 28, which is the animal contacting surface, has begun to move inward, as indicated by vector component 73; however, it includes a longitudinal component of movement 74 which is moving in the opposite direction from that of the animal. At the 30° position, the contacting surface 28 is moving laterally inward as indicated by component 76; however, the longitudinal component of movement is now zero. In the 10° position, the arcuate surface 28 is still moving inward, but now it has a longitudinal component 78 which is moving in the same direction as that of the animal. As right gate 16 approaches the 0° closed position, there is no inward component of movement and the longitudinal component of movement 80 is at its maximum, moving in the same direction as that of the animal, which approximates the point when the animal impacts surface 28.

The speed of movement of the gates 14 and 16 can be varied through adjustment of the hydraulic system. As the animal enters the chute and sees the open end, he continues to move forward to exit the head gate 12. At some point, with the animal partly through the chute 10, the operator actuates the valve and closes the gates 14 and 16 after the animal's head has passed therethrough. The front shoulders and neck of the animal will impact the arcuate surface 28 which surface spreads the load on the animal. If the animal attempts to force its way, the gate will yield due to action of springs 50 located at each corner of the head gate frame 18. Since, at the time of impact with surface 28, the gates 14 and 16 are moving longitudinally with the animal, the closing velocity at impact is reduced and, presumably, the potential trauma to the animal is also reduced.

Although, the preferred embodiment of the invention has been disclosed, it should be appreciated that variations and modification may be made thereto without departing from the spirit of the invention.

What I claim as my invention is:

1. An improved head gate assembly on a cattle squeeze chute, the chute having longitudinally extending sidewalls extending along the path the cattle move through the chute and entry and exit ends on the chute, the head gate being attached to the exit end of the chute, the head gate assembly comprising:

A pair of gates, each gate being pivotally attached to the chute about separate vertical axes, said axes are positioned forward of the plane of the closed gates to permit the gates to have a forward component of movement as they approach the closed position;

actuation arms attached to the gates; and a linear actuator attached to said arms for opening and closing said gates.

2. An improved head gate, as set forth in claim 1, wherein each gate includes an animal contacting plate which is arcuate in shape with the radius point of that arcuate surface positioned approximate the gate axis of rotation.

3. An improved head gate, as set forth in claim 1, wherein the gates rotate from the full open to the full closed positions through an angular range of between 70 and 110 degrees.

4. An improved head gate, as set forth in claim 1, wherein the gates rotate from the full open to the full closed positions through an angular range of between 80 and 100 degrees.

5. An improved head gate, as set forth in claim 1, wherein each gate includes an animal contacting surface which is arcuate in shape, extending through approximately 90°, with the radius point of the arcuate contacting surface positioned near the gate axis of rotation.

6. An improved head gate, as set forth in claim 1, wherein the gates in their closed position are positioned between the axis of rotation of each gate and the exit end of the squeeze chute.

7. An improved head gate assembly on a cattle squeeze chute, the squeeze chute having longitudinal extending sidewalls and entry and exit ends to permit the cattle to move forward from the entry end through the exit end, the improvement comprising a head gate assembly comprising:

A pair of gates mounted on the exit end of the squeeze chute, each gate pivotally attached about a vertical axis, said axes are positioned forward of the plane of the closed gates to permit the gates to have a forward component of movement as they approach the closed position; and actuation arms attached to the gates for opening and closing said gates.

* * * * *